United States Patent [19]
Pino

[11] Patent Number: 5,119,861
[45] Date of Patent: Jun. 9, 1992

[54] FAIL SAFE PIPE PLUG

[76] Inventor: Richard Pino, 2640 Janson Dr., Chesapeake, Va. 23321

[21] Appl. No.: 536,699

[22] Filed: Jun. 11, 1990

[51] Int. Cl.$^5$ .............................................. F16L 55/11
[52] U.S. Cl. .......................................... 138/89; 138/93
[58] Field of Search ...................... 138/89, 93, 45, 46; 220/235

[56]  References Cited
U.S. PATENT DOCUMENTS

| B 550,636 | 12/2970 | Mearne | 138/89 |
|---|---|---|---|
| 2,288,731 | 7/1942 | Newlon | 138/89 |
| 2,843,154 | 7/1958 | Hosking | 138/93 |
| 2,923,323 | 9/1959 | Franck | 138/89 |
| 3,015,469 | 1/1962 | Falk | 138/46 |
| 3,022,977 | 2/1962 | Jones | 251/61 |
| 3,444,898 | 5/1969 | Caple | 138/89 |
| 3,457,959 | 7/1969 | Cooper | 138/90 |
| 3,946,761 | 3/1976 | Thompson | 138/93 |
| 4,185,806 | 2/1980 | Dremann | 251/61.1 |
| 4,254,791 | 3/1981 | Bron | 138/45 |
| 4,467,835 | 8/1984 | Champleboux | 138/93 |
| 4,483,457 | 11/1984 | Schukei | 138/93 |
| 4,614,206 | 9/1986 | Mathison | 138/93 |

FOREIGN PATENT DOCUMENTS

| 1511001 | 12/1967 | France | 220/235 |
|---|---|---|---|
| 1513547 | 1/1968 | France | 220/235 |

Primary Examiner—Harvey C. Hornsby
Assistant Examiner—Terrence R. Till
Attorney, Agent, or Firm—Stephen E. Clark

[57]  ABSTRACT

Normally closed valve for controlling flow of fluid material through a straight, non-tapered conduit has resilient elastomeric seal attached to the perimeters of two axially aligned rigid end plates. Elasticity of elastomeric seal draws end plates together while radially expanding so as to engage and seal against the inner wall of conduit. Valve may be opened by axially separating the two opposing end plates using a locally actuated displacer mechanism attached to one of the end plates, causing the elastomeric seal to radially contract and the valve to open.

1 Claim, 15 Drawing Sheets

FAIL SAFE PIPE PLUG

BACKGROUND OF THE INVENTION

1. Field of Invention

The present invention relates to fluid control test plugs. In particular, the present invention relates to locally actuated, fail safe (i.e. normally closed), fluid material control test plugs adapted for use inside of fluid material transmission conduits.

2. Description of the Prior Art

The present invention is particularly adapted for use inside of substantially straight conduits of uniform cross-section, (as well as within tapered conduits), wherein it may be desirable to seal at least one end of the conduit, (for example, to pressure-test the conduit or to prevent unwanted flow through the conduit).

Valves which control fluid material flow through conduits are well known. In most prior devices, it is necessary to build the valve into the conduit itself—as, for example, with common gate valves. The problem of such valves is they become, more or less, permanent fixtures in the conduit, thus affecting fluid flow even when the valve is not in use (i.e. when the valve is open). Furthermore, such valves also have a disadvantage in that they have the inherent characteristic of not being easily re-positionable within, or removable from, the conduit.

It is well known in the prior art to use expandible-type test plugs, in pipe lines in order to determine whether the installation will withstand the operating pressure necessary for proper functioning of the pipeline. Many such prior test plugs are of the type having a resilient plug that is expanded into sealing engagement with the inner wall of the conduit to be tested in order to compartmentalize the conduit.

After such prior test plugs are in place, a pressurized fluid is typically injected into the conduit up to a predetermined pressure to determine if the installation will withstand operating conditions. A great disadvantage with such prior devices is that they are normally open. Should, for any reason, there be a loss of pressure to the plug, such as, for example, due to a leak in an air supply line, then the valve would automatically open, allowing an undesired flow of fluid material therethrough.

Remotely actuated prior pneumatic valves are known which are normally closed, such as the device illustrated in U.S. Pat. No. 3,022,977. Prior devices of this type generally comprise a resilient elastomeric vessel which, under normal conditions, is of sufficient cross-sectional area to occupy, and therefore seal off, the cross-sectional area of a conduit within which it is disposed. When, by use of a remote vacuum source, air pressure is exhausted from the elastomeric vessel to below atmospheric pressure, the volume of the vessel decreases and its cross-sectional area also decreases, thereby breaking the seal between the outer wall of the elastomeric vessel and the inner wall of the conduit. A problem of such prior devices is that they require a remote vacuum source for their operation.

A similar group of prior devices is represented by the pneumatic valve illustrated in U.S. Pat. No. 4,185,806. Prior devices of this type typically comprise a resilient elastomeric vessel which, under normal conditions, is of cross-sectional area sufficient to occupy, and therefore seal off, the cross-sectional area of a conduit within which it is disposed. When, by use of a remote source, presesurized air is forced into the elastomeric vessel, the volume of the vessel expands and its cross-sectional area (as measured perpendicular to the conduit's wall) decreases, thereby breaking the seal between the outer wall of the elastomeric vessel and the inner wall of the conduit.

One problem of prior devices of this type is that they depend on the volumetric expansion of their elastomeric vessel in order to open such valves.

A great disadvantage of devices of this type is inherent in their reliance on the volumetric expansion of the elastomeric vessel in order to open the valve. Because the volume of such elastomeric vessels must vary substantially during operation of the device, such prior vessels must be made almost entirely of elastomeric, (i.e. readily deformable), material. Consequently, such prior devices are inherently incapable of withstanding large axial loads—as such loads deform the elastomer and compromise the integrity of the seal—and are, therefore, only adapted for use in low pressure applications (such as described in U.S. Pat. No. 3,022,977), or when used inside of tapered conduits or in conjunction with rigid accessory restraining supports, (each of which as described in U.S. Pat. No. 4,185,806).

Still another problem of prior devices of this character that they rely upon a remote source of pressurized fluid for their operation.

Another problem of such prior devices is that, if the elastomeric vessel should, for any reason, develop a leak, the vessel will automatically depressurize, thereby making it extremely difficult, if not virtually impossible, to remove the damaged plug from inside of the conduit.

OBJECTS OF THE INVENTION

Accordingly, it is a primary object of the present invention to provide a test plug which is laterally insertable into a conduit of uniform cross-sectional area.

It is another object of the present invention to provide a device of the character described which has a normally closed, fail safe condition.

It is another object of the present invention to provide a device of the character described in which a resilient elastomer effects a seal against the inner wall of a conduit.

It is another object of the present invention to provide a device of the character described which can be used in high-pressure applications.

It is another object of the present invention to provide a device of the character described which can be locally actuated.

It is another object to provide an embodiment of the present invention wherein the plug may be manually opened.

It is another object to provide an embodiment of the present invention which may be opened at atmospheric pressure.

Further objects and advantages of the invention will become apparent from a consideration of the drawings and ensuing description thereof.

SUMMARY OF THE INVENTION

Description of the Preferred Embodiment of the Invention

Figure 1:
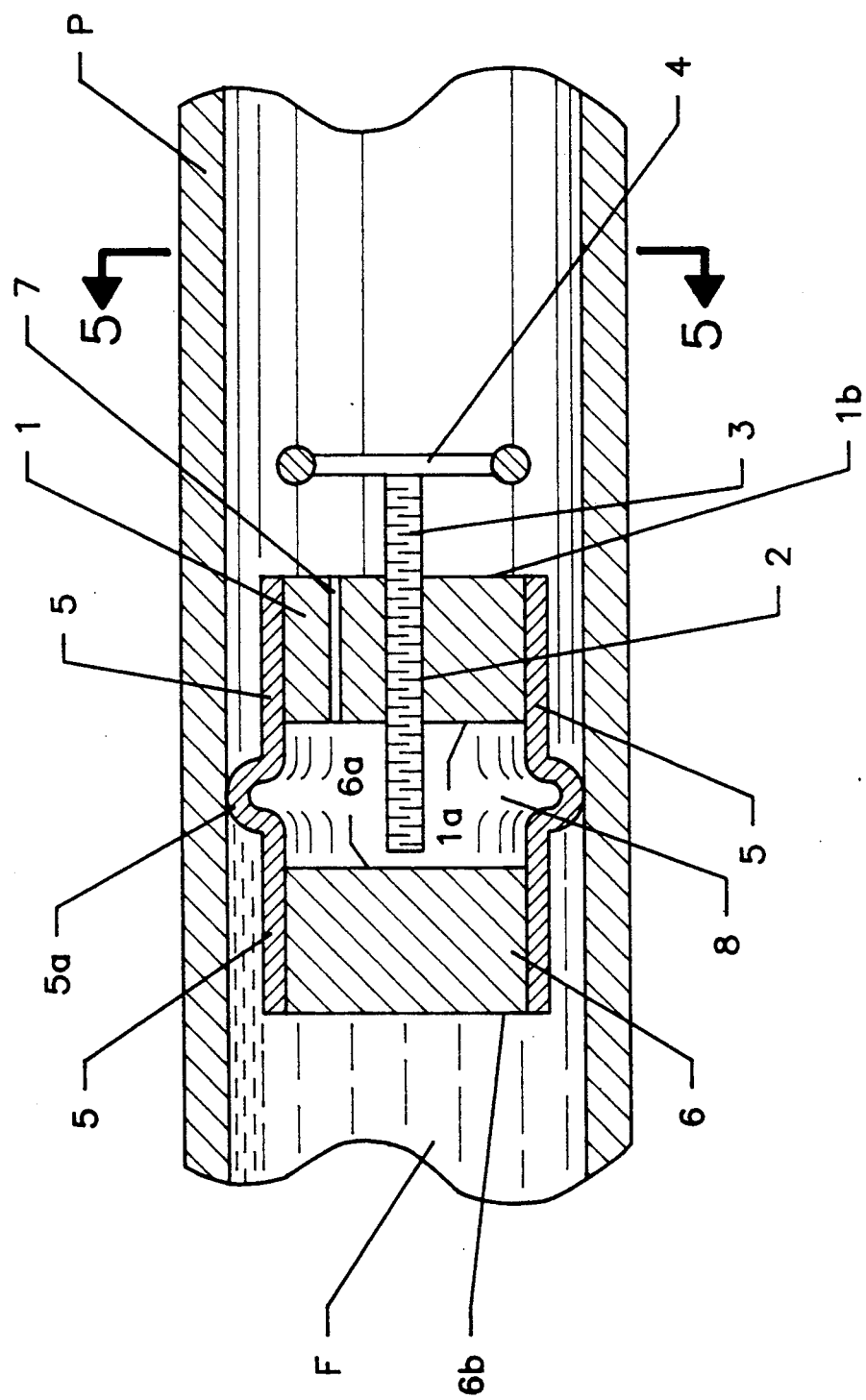
FIG. 1 is a medial cross-sectional view of the preferred embodiment of the present invention, illustrated in the operative position inside of a conduit showing the device in the relaxed, or sealed, position.
Figure 2:
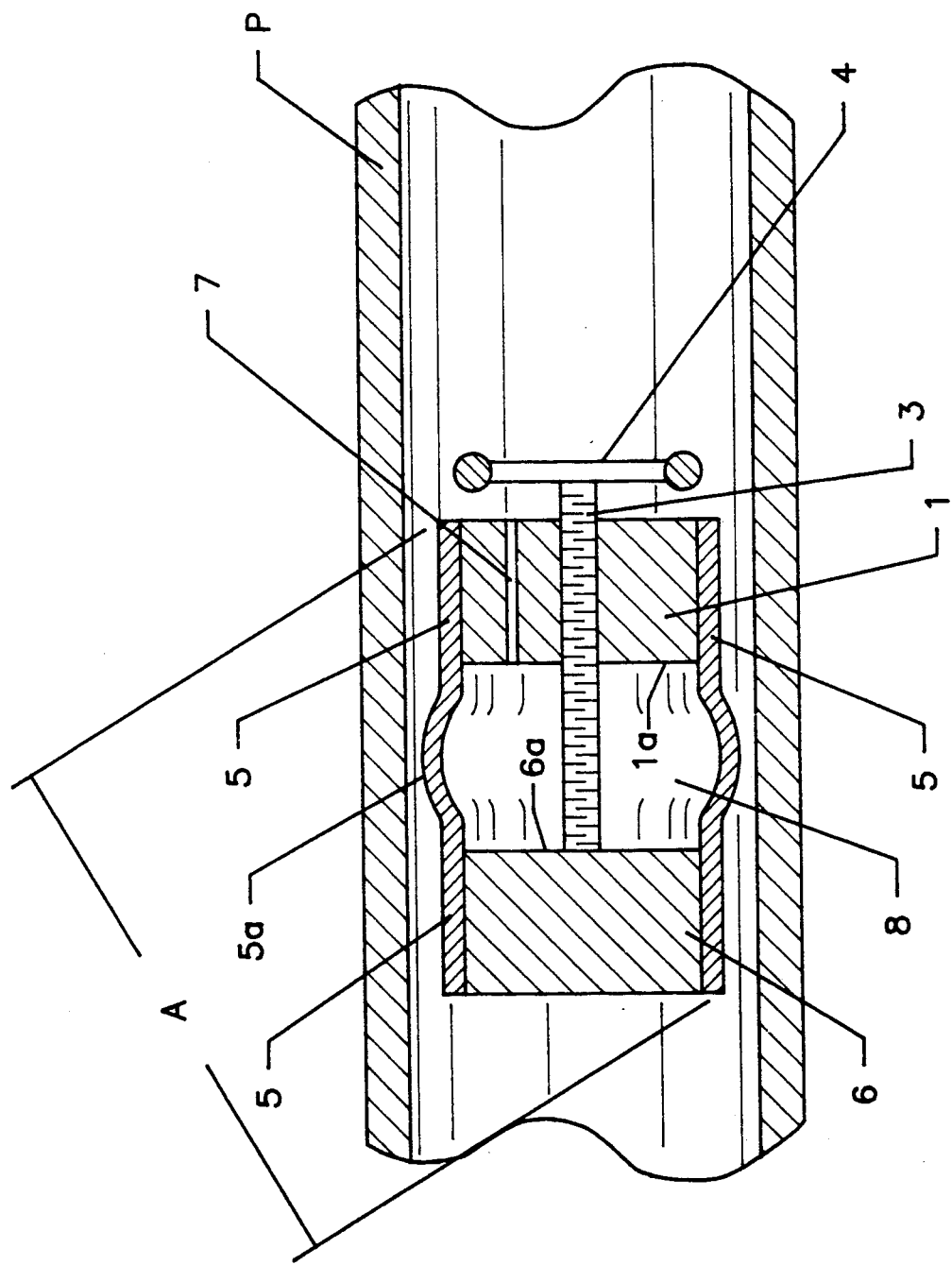
FIG. 2 is a medial cross-sectional view of the present invention similar to FIG. 1, but showing the device in its stretched position.

The preferred embodiment of the invention, as shown in FIG. 1 and FIG. 2, is a locally actuated, fail safe plug which may be readily inserted into a straight section of pipe (P).

Primary end plate (1) has an internally threaded hole (2) extending axially therethrough. An externally threaded displacer rod (3) is engaged with the threads of the hole (2) of the primary end plate (1). Handle (4) is attached to one end of the displacer rod (3).

A resilient elastomer (5) is continuously attached to the perimeter of the primary end plate (1) and to the perimeter of the follower end plate (6), as shown in FIG. 1. Resilient elastomer (5) preferably has a continuous convex indentation (which essentially effects the sealing member of device, and which hereinafter is referred to as "seal" (5a)) in that area of the elastomer (5) which extends between the primary end plate (1) and the follower end plate (6). In its normal, (i.e. relaxed), state, the outside circumference of the seal (5a) is equal to, or greater than, the circumference of the inner wall of the pipe (P) into which the invention is to be inserted.

In the preferred embodiment of the invention, a vent (7) in the primary end plate (1) allows air to freely pass from outside the device to inside of the cavity (8) which is formed between the primary end plate (1), the follower end plate (6), and the resilient elastomer (5).

OPERATION

An advantage of the present invention over the prior art is that it can be used inside of conduits having different cross-sectional shapes. However, for simplicity the preferred embodiment of the invention of the invention is first described in use in a straight, circular pipe.

By manually turning handle (4), displacer rod (3) rotates relative to the (stationary) primary end plate (1), with which it is in threaded engagement. As the displacer rod (3) turns, it axially moves until its end contacts the follower end plate (6). Further turning of the handle (4) and displacer rod (3) causes the displacer bar (3) to push against the follower end plate (6), thereby separating the primary end plate (1) and the follower end plate (6) from each other.

As the primary end plate (1) and the follower end plate (6) are moved farther apart, the portion of the resilient elastomer, (including seal (5a)), between the two end plates (1) and (6) becomes stretched axially, causing the cross-sectional area (as measured perpendicular to the wall of the pipe (P)) of the seal (5a) to shrink.

Once the diameter of the seal (5a) becomes smaller than the inside diameter of a pipe (P), the device can easily be inserted into an open end of the pipe (P).

In the preferred embodiment of the invention, resilient elastomer (5) is constructed of an elastic, impermeable material (e.g. rubber), such that the elastomer (5) applies a compressive force which tends to pull the primary (1) and the follower (6) end plates toward each other.

After the device is positioned and axially aligned in the pipe (P), the handle (4) may be manually turned in the direction opposite that described above, thereby causing the displacer rod (3) to withdraw from the follower end plate (6). As the displacer rod (3) is withdrawn from the follower end plate (6), the elasticity of the resilient elastomer (5)—(or more specifically, the elasticity of that portion of the elastomer (5) which extends between the two end plates (1) and (6))—pulls the follower end plate (6) toward the primary end plate (1). As the distance between the primary end plate (1) and the follower end plate (6) decreases, the seal (5a) portion of the resilient elastomer relaxes, and the outside diameter of the seal (5a) area of the resilient elastomer increases.

The outside diameter of the seal (5a) can continue to increase until it (the seal (5a)) begins to press against the inner wall of the pipe (P). Continued turning of the handle (4) in this direction causes the elastomer (5) to relax and, accordingly, increases the sealing (i.e. radial) force between the seal (5a) and the inner wall of the pipe (P).

Figure 5:
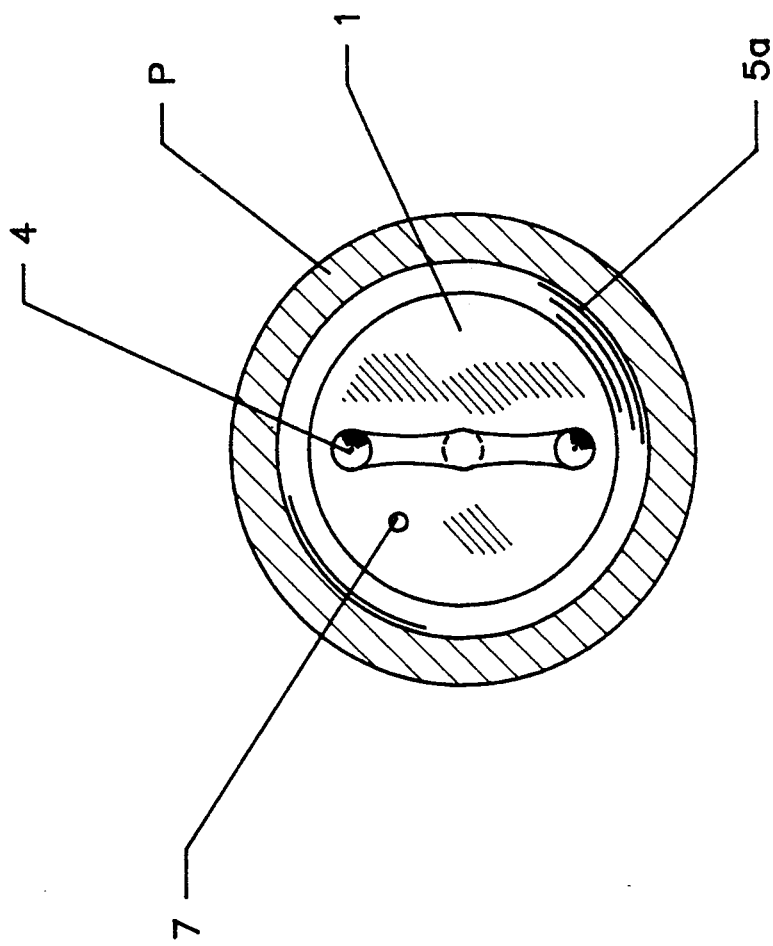
FIG. 5 is an end view of the preferred embodiment of the present invention generally taken along the line 5—5 of FIG. 1.

In addition to providing the functions specified above, the follower end plate (6) and the primary end plate (1) provide rigid structural definition to the shape (i.e. profile) of the elastomer. In the preferred embodiment of the invention, the profile (i.e. as viewed looking axially into the pipe, per FIG. 5) of the end plates (1) and (6) are generally similar in shape to that of the cross-section of the pipe (P) in which the device is to be used. Furthermore, in the preferred embodiment of the invention, the area of the end of the primary end plate (1) and the area of the end of the follower end plate (6) are each at least 90% of the cross-sectional area of the inside of the pipe (P) in which the device is to be used. It will be appreciated by those skilled in that art that follower end plate (6), which occupies at least 90% of the cross-sectional area of the pipe (P), consequently bears at least 90% of the axially directed hydrostatic force which fluid (F) exerts against the invention.

It will also be appreciated by those skilled in the art that, because the follower end plates (6) is constructed of a rigid material, the installed invention, (as shown in FIG. 1), can withstand higher axially directed hydrostatic forces without disfunctionally distorting the seal (5a) than would be possible with, for example, prior devices which substantially comprise an inflatable elastomeric vessel. Accordingly, it will be appreciated by those skilled in that art that the device thus far described is adaptable for use in high-pressure applications.

Although the embodiment of the invention thus far described is particularly suited for use inside of pipes of circular cross-section, it will be appreciated by those skilled in the art that the present invention is also adapted for use inside of conduits of non-circular cross-sections, provided the cross-sectional shape of the end plates (1) and (6) are substantially geometrically similar to the cross-sectional shape of the conduit.

In the preferred embodiment of the invention, the diametric diagonal distance (A) between the outside surfaces of the primary (1b) and follower (6b) end plates is greater than the inside diameter of the pipe (P) in which the device is disposed, as measured when the device is in its relaxed (i.e. closed) state. It will be appreciated by those skilled in the art that the device thus described is substantially self-aligning, inasmuch as the maximum degree of misalignment possible within a pipe (P) of known inside diameter is generally dictated by the extent to which the diagonal distance (A) exceeds the inside diameter of the pipe (P).

It will also be appreciated by those skilled in the art that when the follower end plate (6) moves away from the primary end plate (1), the volume of the cavity (8) between the two end plates (1) and (6) may either increase, decrease, or remain the same—depending primarily upon the shape of the device and the ratio of the diameter of the pipe to the width (C) of the cavity (8). In the preferred embodiment of the invention, air pressure inside and outside of the invention remains constant, regardless of any variation in the volume of cavity (8), as air freely passes in either direction through vent (7) which is located in the primary end plate (1).

Figure 3:
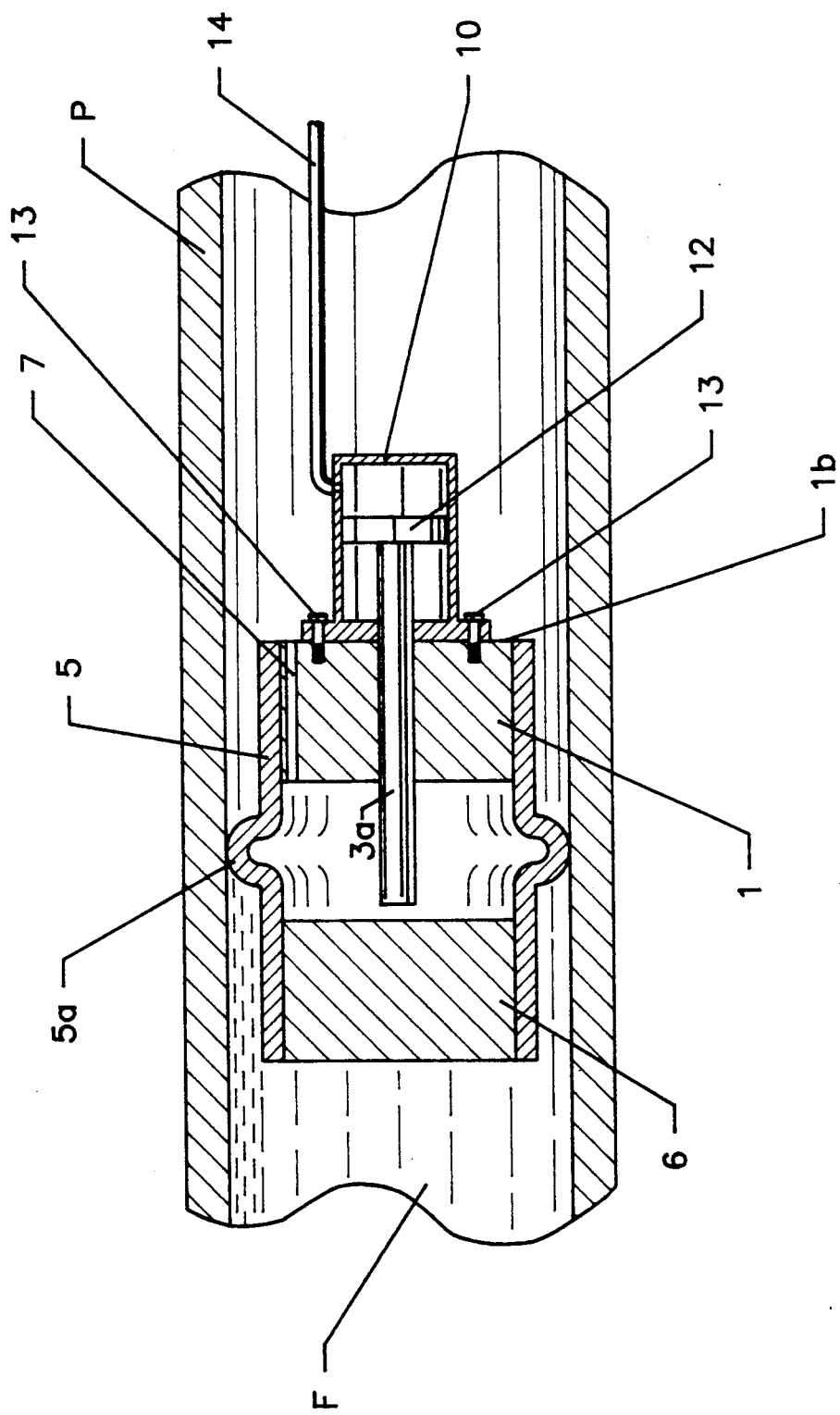
FIG. 3 is a medial cross-sectional view of an alternate embodiment of the present invention comprising a fluid actuated displacement member, illustrated in the operative position inside of a conduit showing the device in the relaxed, or sealed, position.
Figure 4:
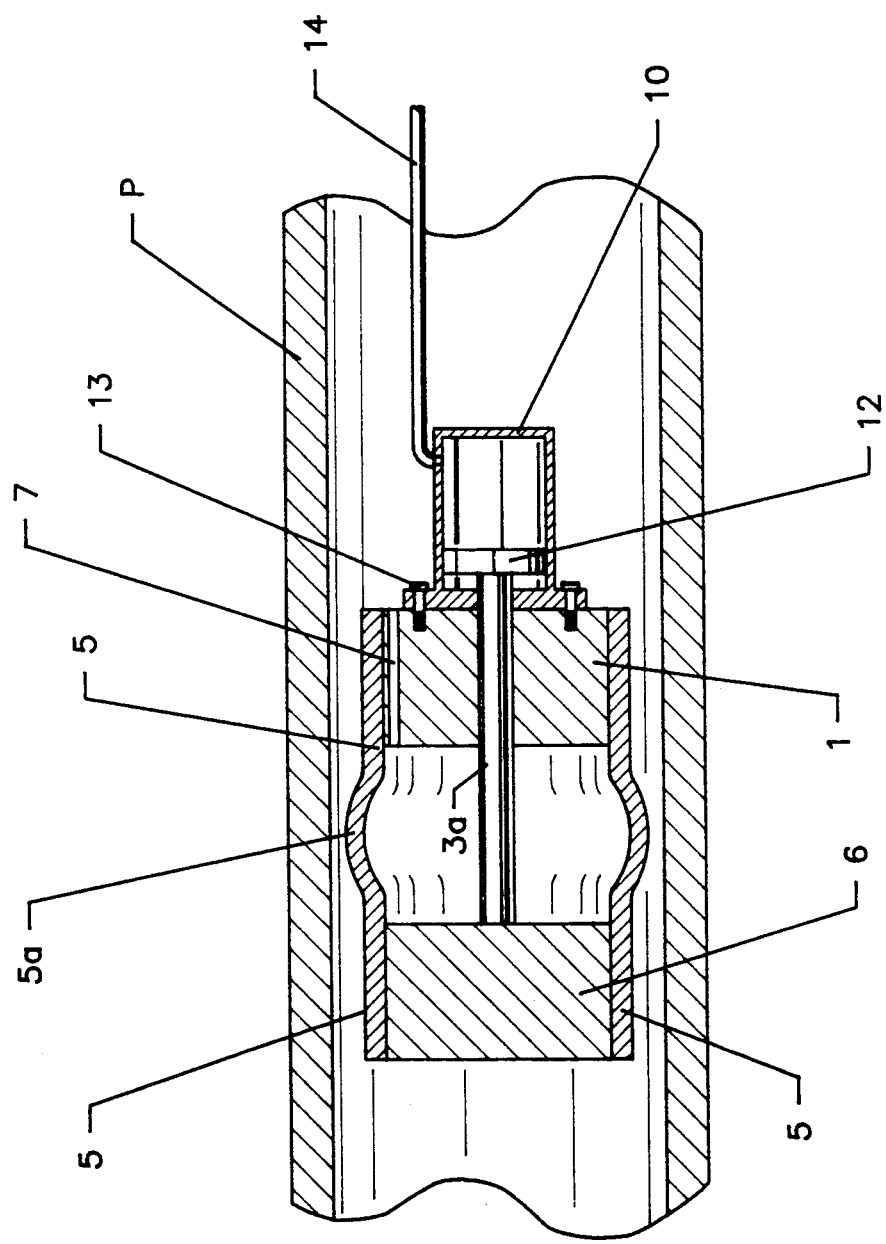
FIG. 4 is a medial cross-sectional view of an alternate embodiment of the invention, similar to FIG. 3, but showing the device in its stretched position.

An important modification of the present invention is illustrated in FIGS. 3 and 4. FIGS. 3 and 4 substantially correspond to FIGS. 1 and 2, respectively, except that the invention shown in FIGS. 3 and 4 comprises a means for pneumatically (or, alternatively, hydraulically) opening the plug. In this modification of the invention, a pneumatic cylinder (10) is attached to a modified primary end plate (1) by threaded fasteners (13). Inducing pressurized air into the pneumatic cylinder (8) via conduit (14) causes piston (12) to be displaced toward the modified primary end plate (1). This in turn causes a modified displacer rod (3a), which is attached to the piston (12), to move in the direction of the follower end plate (6). In a similar manner to the operation of the preferred embodiment of the invention described above, movement of the modified displace rod (3a) facilitates opening of the seal (5a). By exhausting the air in the cylinder (10) through conduit (14), the modified displacer rod (3a) may be retracted and, in a manner similar to the operation of the preferred embodiment of the invention described above, cause the seal (5a) to relax (i.e. to close).

It can be appreciated by those skilled in the art that this modification of the invention (FIGS. 3 and 4) effects a normally closed pipe plug. Additionally, it will be appreciated by those skilled in the art that, if, for any reason, a leak should occur in either the conduit (14) or in the cylinder (10), the resilient elastomer (5) will relax, causing the seal (5a) to be closed.

Although this (above) modification of the present invention is illustrated and described using a pneumatic cylinder (10), it is understood that a hydraulic cylinder can be used in its place.

Figure 6:
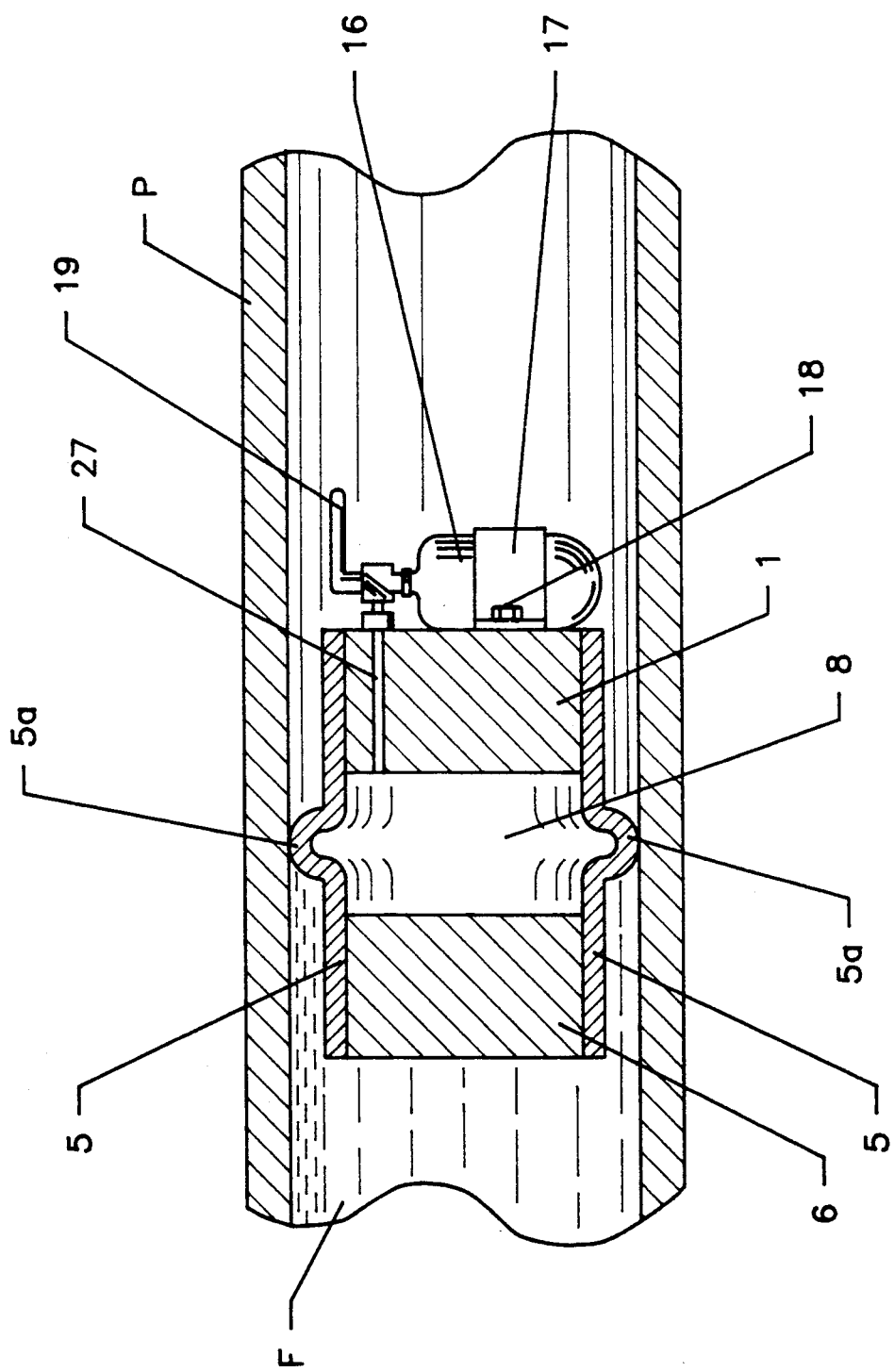
FIG. 6 is medial cross-sectional view of an alternate embodiment of the present invention having a local compressed gas actuator.

Another modification of the present invention is shown in FIG. 6. In this modification of the invention, the follower end plate (6) can be displaced away from the primary end plate (1) by pressurizing the cavity (8) (defined by the primary end plate (1), the follower end plate (6), and the resilient elastomer (5)). An orifice (27) is provided in the primary end plate (1) through which pressurized air can be introduced into the cavity (8) from a local actuator. The local actuator illustrated in FIG. 6 comprises a tank (16) of pressurized air which is secured to the primary end plate (1) by bolts (8) and a restraining strap (17), and a two-way valve (19). When the two-way valve (19) is in one setting/position, the valve opens the tank (16) to the orifice (27), thereby allowing pressurized air to flow from the tank (16), through the orifice (27), and into the cavity (8). This in turn displaces the follower end plate (6) and causes the seal (5a) to open. In the other setting/position of the two-way valve (19), the tank (16) is closed and the vent (7) is open to the atmosphere, thereby venting the cavity (8) to the atmosphere, and allowing the seal (5a) to relax (i.e. to close).

While the embodiment of the invention illustrated in FIG. 6 and described above uses a orifice (27) and a two-way valve (19) in order to selectively introduce and to exhaust pressurized air into the cavity (8), it is understood, and will be appreciated by those skilled in the art, that two or more separate orifices could be used in conjunction with separate valves for the purposes of independently filling and exhausting the cavity (8).

Joint Tester Modification

Figure 7:
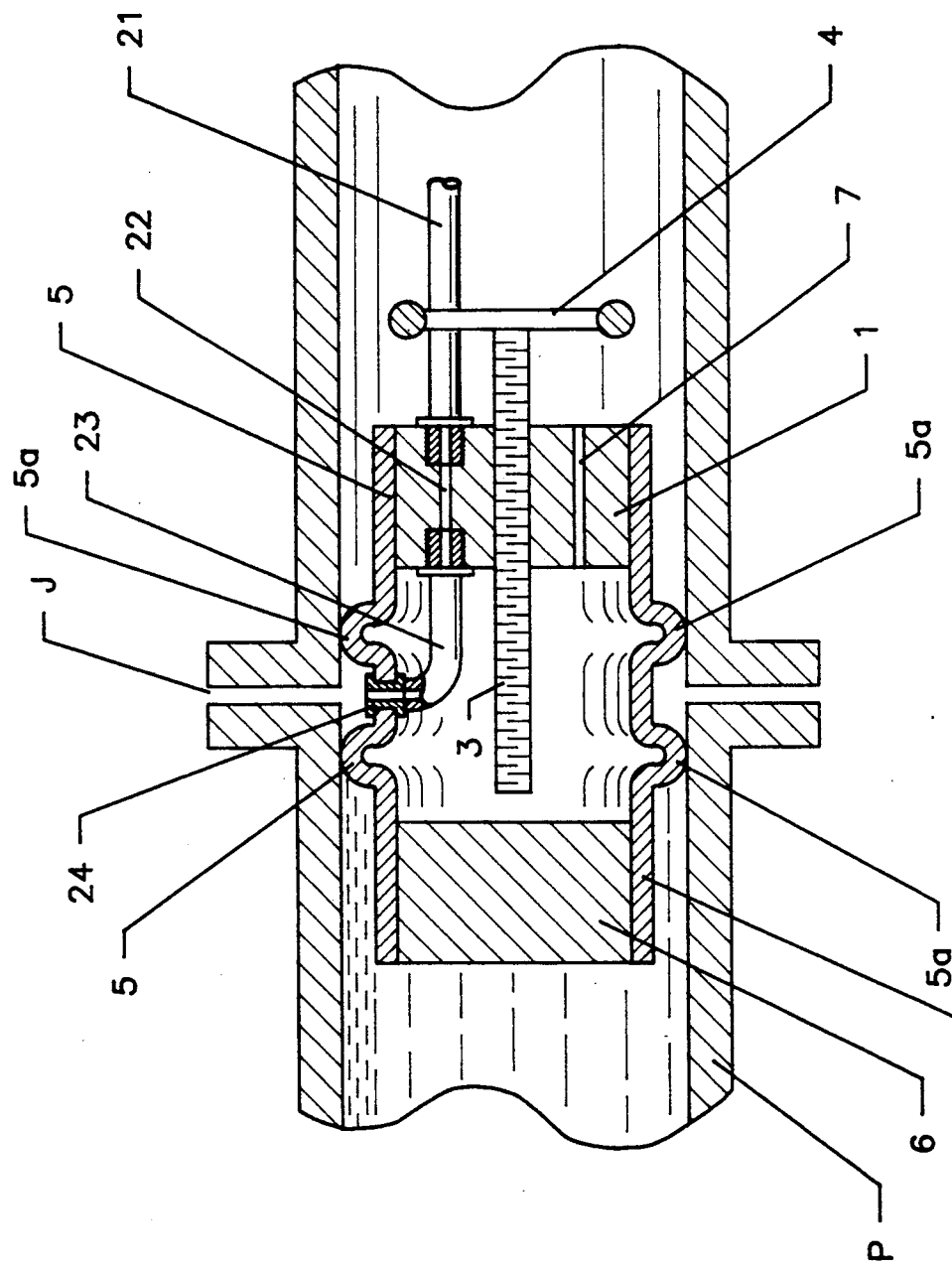
FIG. 7, is a medial cross-sectional view of an alternate embodiment of the present invention comprising two parallel sealing members and a pressure test conduit.

A modification of the present invention particularly adapted for testing pipe joints, (without the need to test complete lengths of pipe), is shown in FIG. 7. This modification of the invention is provided with a pair of seals (5a) in the area of the elastomer (5) which extends between the opposite faces of the primary end plate (1) and the follower end plate (6).

When the handle (4) is turned so as to cause the displacer bar (3) to release pressure on the follower end plate (6), the elasticity of the elastomer (5) causes the primary end plate (1) and the follower end plate (6) to pull toward each other. As the elastomer (5) becomes more relaxed (when the two end plates (1) and (6) approach each other), the two seals (5a) press radially against the inside wall of the pipe (P). The two seals (5a) and the inside wall of the pipe (P) define a test cavity (20) around the outside of the elastomer (5). A flexible conduit (23) connected to an air passage (22) in the primary end plate (1) and a test orifice (24) in the elastomer (5) allows the test cavity (20) to be pressurized by air (or other gas) from a remote source (21). By monitoring the air pressure inside of the test cavity (20) it is possible to determine whether there are any leaks in the wall of the pipe (P) between the two seals—for example, at the pipe joint (J).

Multiple Seal Modification

Figure 8:
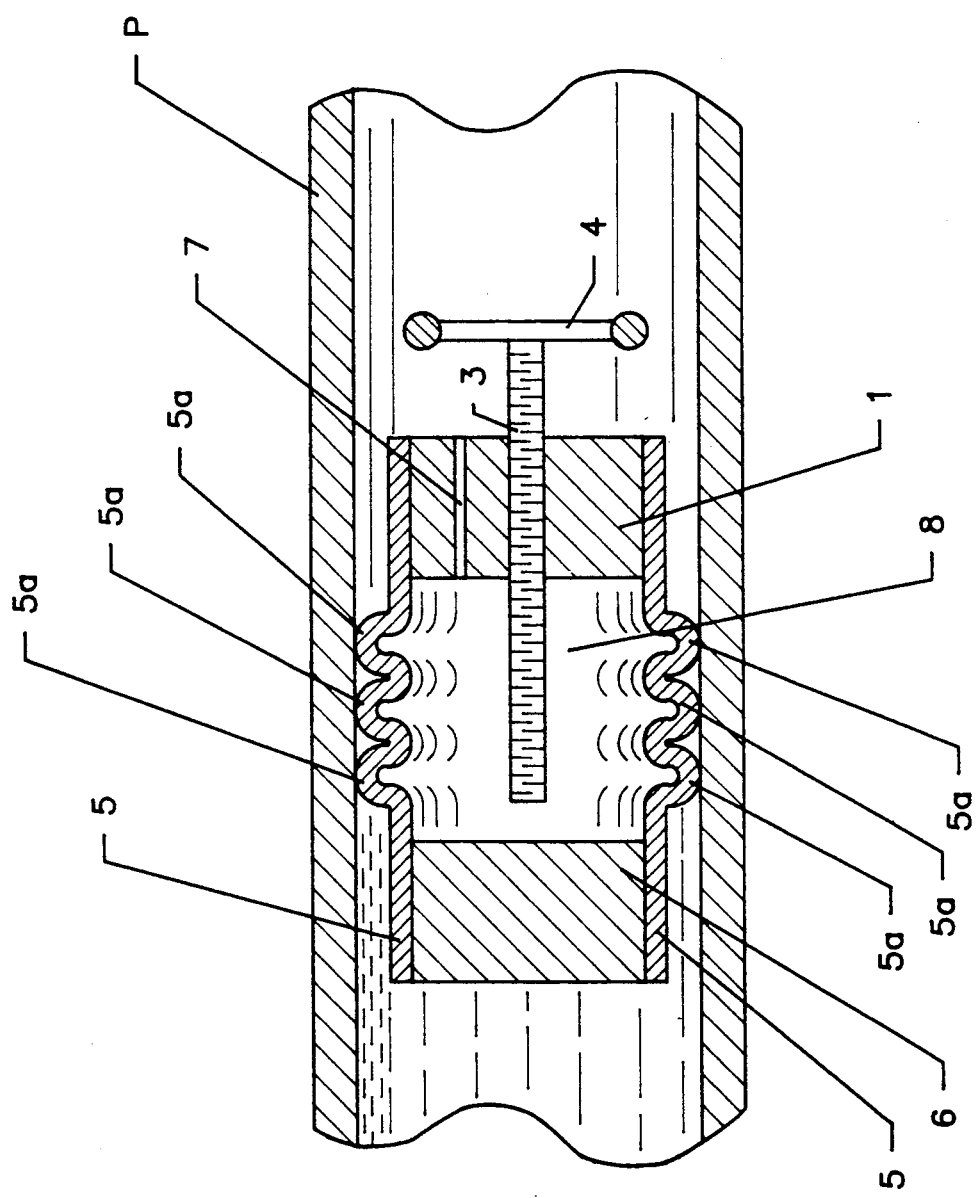
FIG. 8, is a medial cross-sectional view of an alternate embodiment of the present invention comprising three parallel sealing members.

Another modification of the present invention is shown in FIG. 8. This modification of the invention is substantially similar to the preferred embodiment of the invention, except that a plurality of seals (5a) are arranged in a series on the outside of the elastomer (5). The multiple seals (5a) provide the invention with increased fluid-sealing capability.

Spring-Assisted Seal Modification

Figure 9:
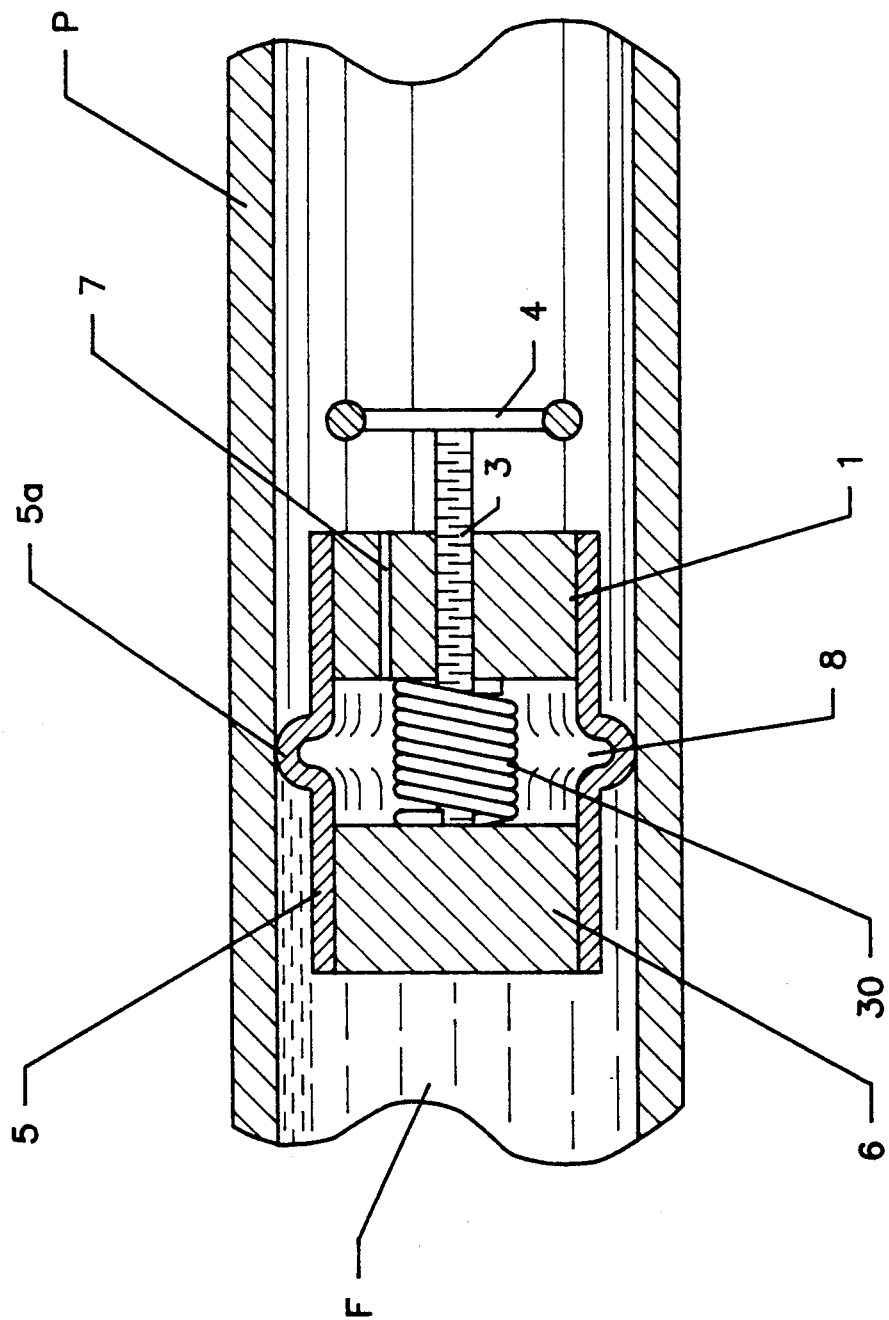
FIG. 9, is a medial cross-sectional view of an alternate embodiment of the present invention showing a bias spring attached to the two end plates.

Another modification of the present invention is shown in FIG. 9. A compression spring (30) is secured to the primary end plate (1) and the follower end plate (6). When the displacer rod (3) is retracted from the follower end plate (6), the spring (30) and the elasticity of the elastomer (5) work together to draw the two end plates (1) and (6) towards each other, and thereby increase the radial force of the seal (5a) against the wall of the pipe (P).

Fluid-Side Restraining Member Modifications

Figure 10:
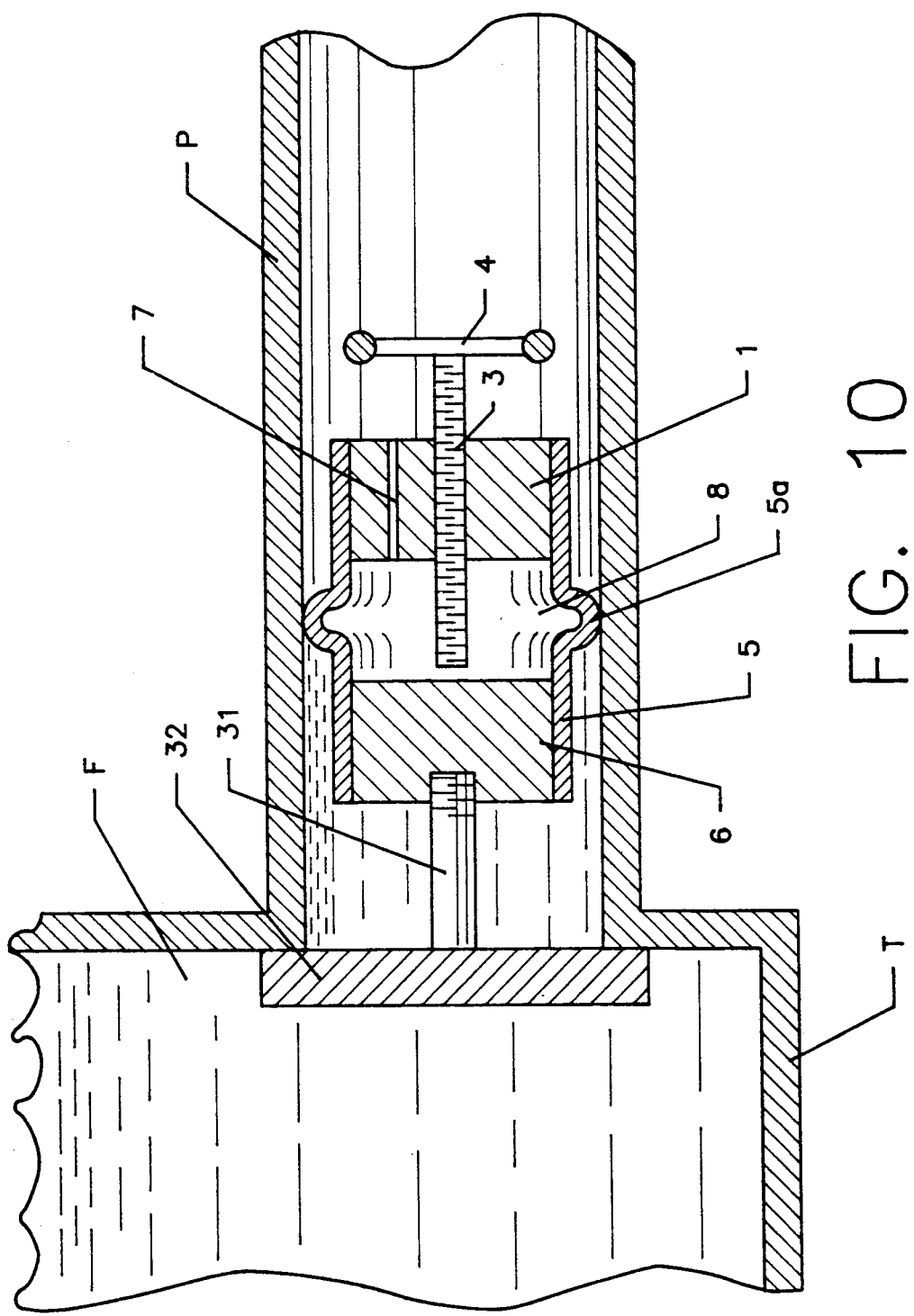
FIG. 10, is a medial cross-sectional view of an alternate embodiment of the present invention showing a fluid-side restraining member.

Another modification of the present invention is shown in FIG. 10. Axial displacement of the invention due to extremely high hydrostatic forces against the follower end plate (6) is resisted by restraining bar (32) which is disposed, for example, at the end of the pipe (P). The restraining bar (32) is larger in at least one dimension than the inside diameter of the pipe (P) in which the invention is to be used. A connecting rod (31) is attached at one end to the restraining bar (32), and at its other end to the follower end plate (6).

Figure 14:
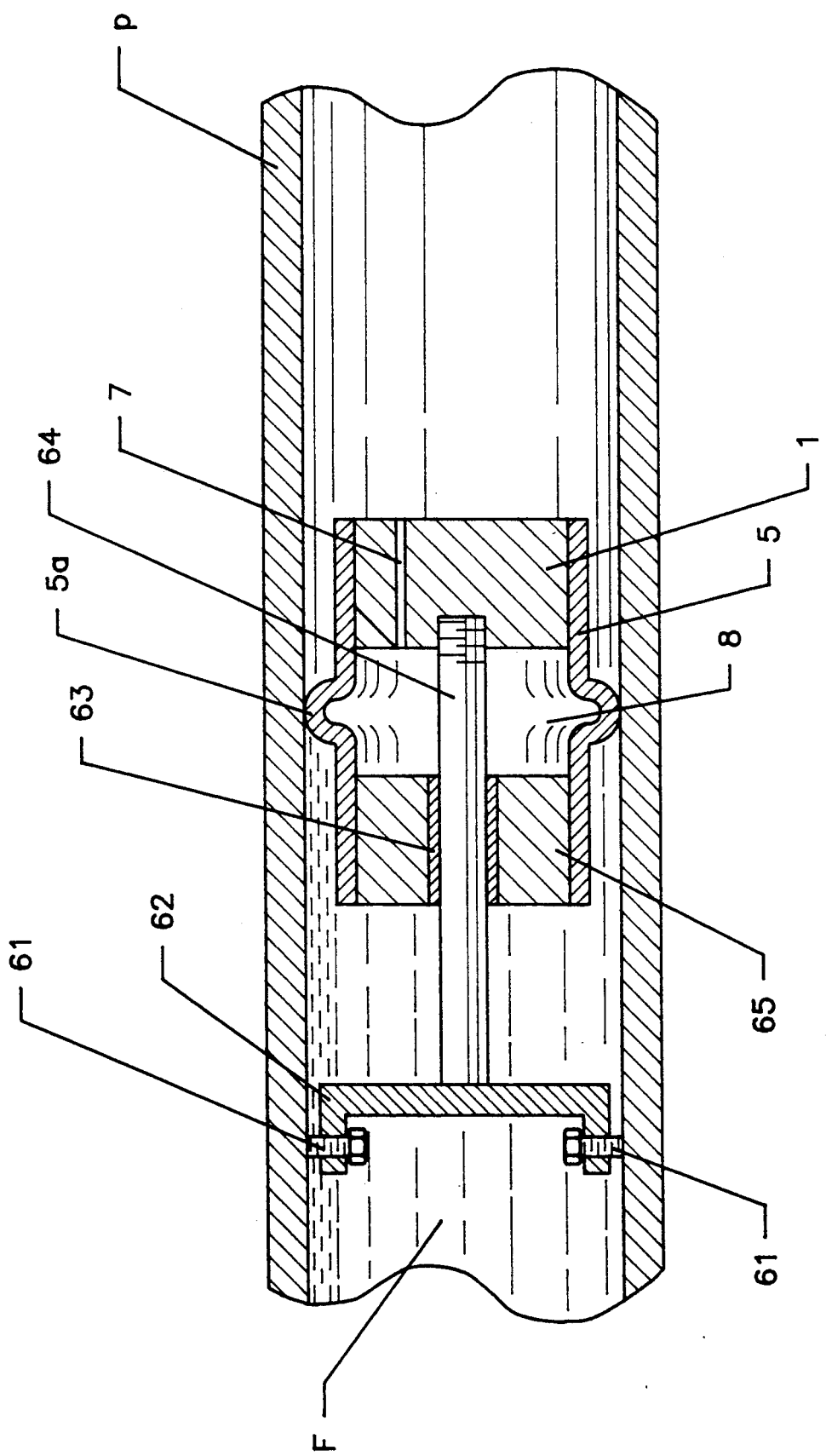
FIG. 14 is a medial cross-sectional view of an alternate embodiment of the present invention showing a fluid-side seal restraining member.

Another embodiment of the present invention having a fluid-side restraining member is shown in FIG. 14. In this embodiment of the invention a fluid-side restraining member (26) is connected to a displacer rod (64). The displacer rod (64) passes through a seal (63) in the fluid-side end plate (65). In this embodiment of the invention, when hydrostatic forces build up against the fluid-side end plate (65), such forces tend to cause the fluid-side end plate to displace towards the primary end plate (1), thereby causing the elastomeric seal (5a) to expand against the inner wall of the pipe (P). It will be appreciated by those skilled in the art that, in the embodiment of the invention shown in FIG. 14, the greater the hydrostatic pressure of fluid (F) against the fluid-side end plate (65), the greater the sealing force of the elastomeric seal (5a) will be against the pipe (P).

Atmospheric-Side Restraining Member Modification

Figure 11:
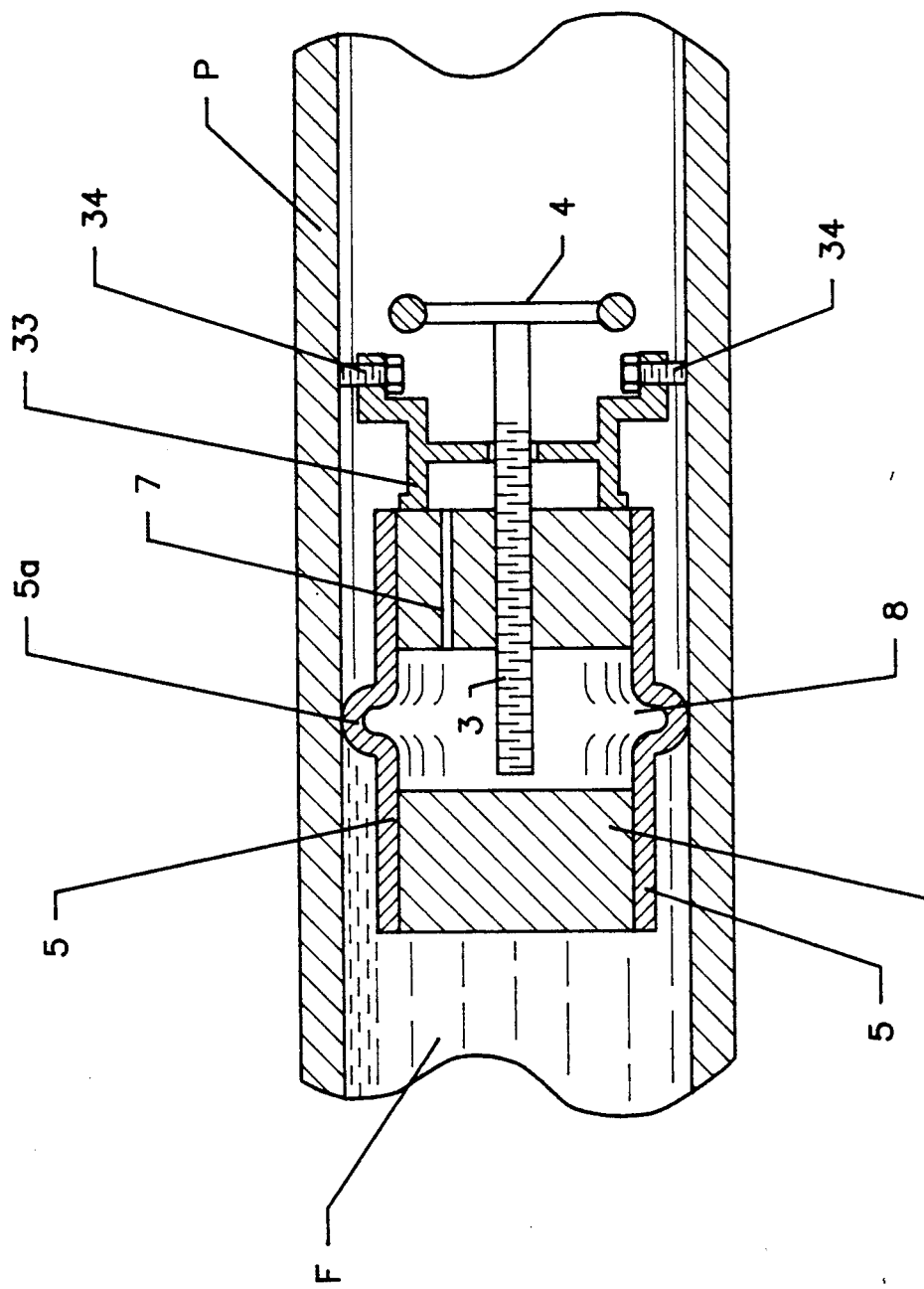
FIG. 11, is a medial cross-sectional view of an alternate embodiment of the present invention showing an atmosphere-side restraining member.

Another modification of the present invention is shown in FIG. 11. A restraining frame (33) is attached to the primary end plate (1) and accommodates radially directed threaded fasteners (34) which, when tightened, apply a radial force against the inside walls of the pipe (P). Friction force between the threaded fasteners (34) and the inside wall of the pipe (P) provides additional force against axial displacement of the invention due to extremely high, axially directed, hydrostatic forces which may be exerted by the fluid (F) in the pipe (P).

Seal Restrainer Modification

Figure 12:
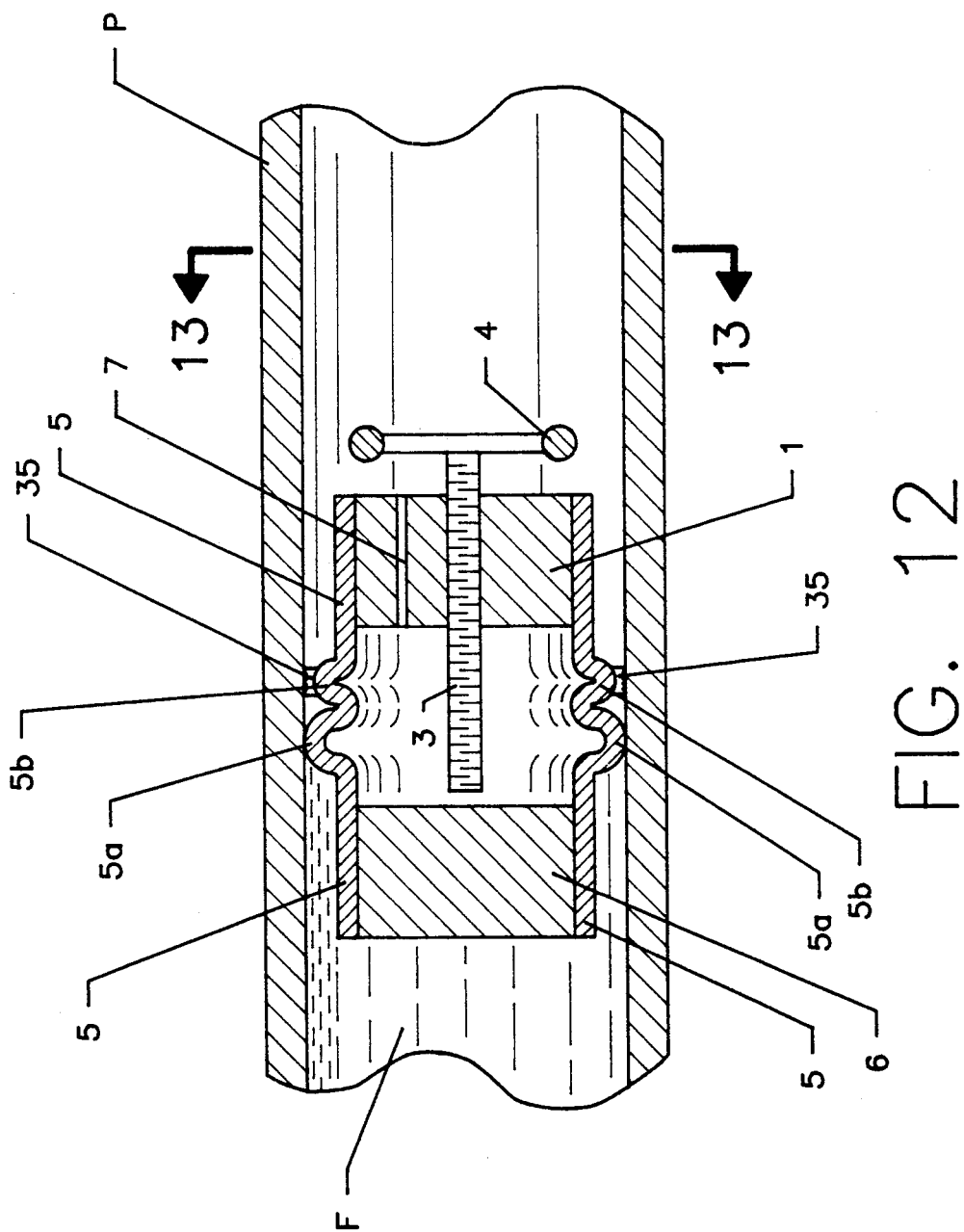
FIG. 12 is a medial cross-sectional view of an alternate embodiment of the present invention showing intermittent conduit-gripping members.
Figure 13:
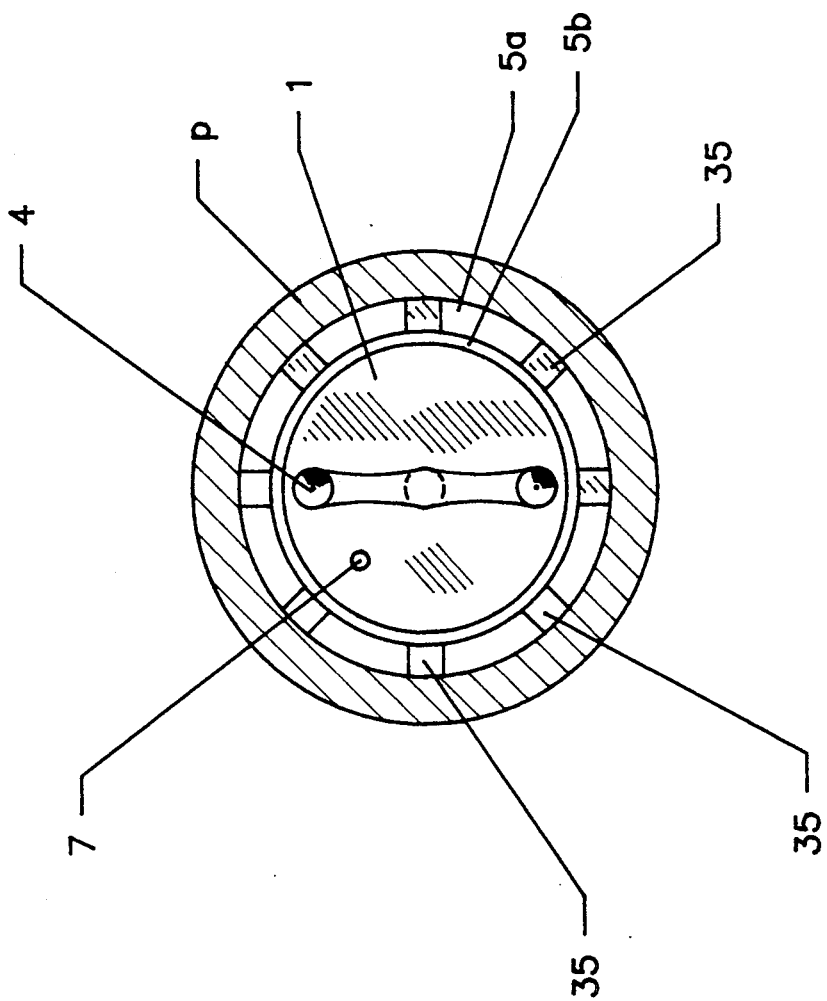
FIG. 13 is an end view of an alternate embodiment of the present invention generally taken along the line 13—13 of FIG. 12.

Another modification of the present invention is shown in FIGS. 12 and 13. As with the preferred embodiment of the invention, elastomeric seal (5a) closes against the inside wall of a pipe (P) when the elastomer (5) is relaxed. In this modification of the invention the resilient elastomer (5) has a second continuous indentation (5b) to which is attached gripping member (35) which are intermittently spaced around the perimeter of the second indentation (5b). The gripping members (35) may be of any material which has a high coefficient of friction against the material of the pipe (P) in which the invention is to be used.

When the two end plates (1) and (6) draw together, the resilient elastomer (5) relaxes, causing the second indentation (5b) to expand radially outwardly, which thereby causes the gripping members (35) to press against the inside wall of the pipe (P). It will be appreciated by those skilled in the art that when the gripping members (35) press against the wall of the pipe (P), the friction between the pipe (P) wall and the gripping members (35) provide additional restraining force against axially directed hydrostatic forces applied by the fluid (F) to the invention.

Resilient Metal Modification

In all of the foregoing discussion of the present invention, (including both the preferred embodiment and its various modifications), a resilient elastomer (5) is continuously attached to the perimeters of the primary (1) and follower (6) end plates. The resilient elastomer (5) described above provides accomplished two functions which are necessary to the operation of the present invention, namely: 1) It biases the devices such that the two end plates (1) and (6) are drawn toward each other by the elastomer (5); and 2) its outer surface (5a) seals against the inside surface of the pipe (P).

Figure 15:
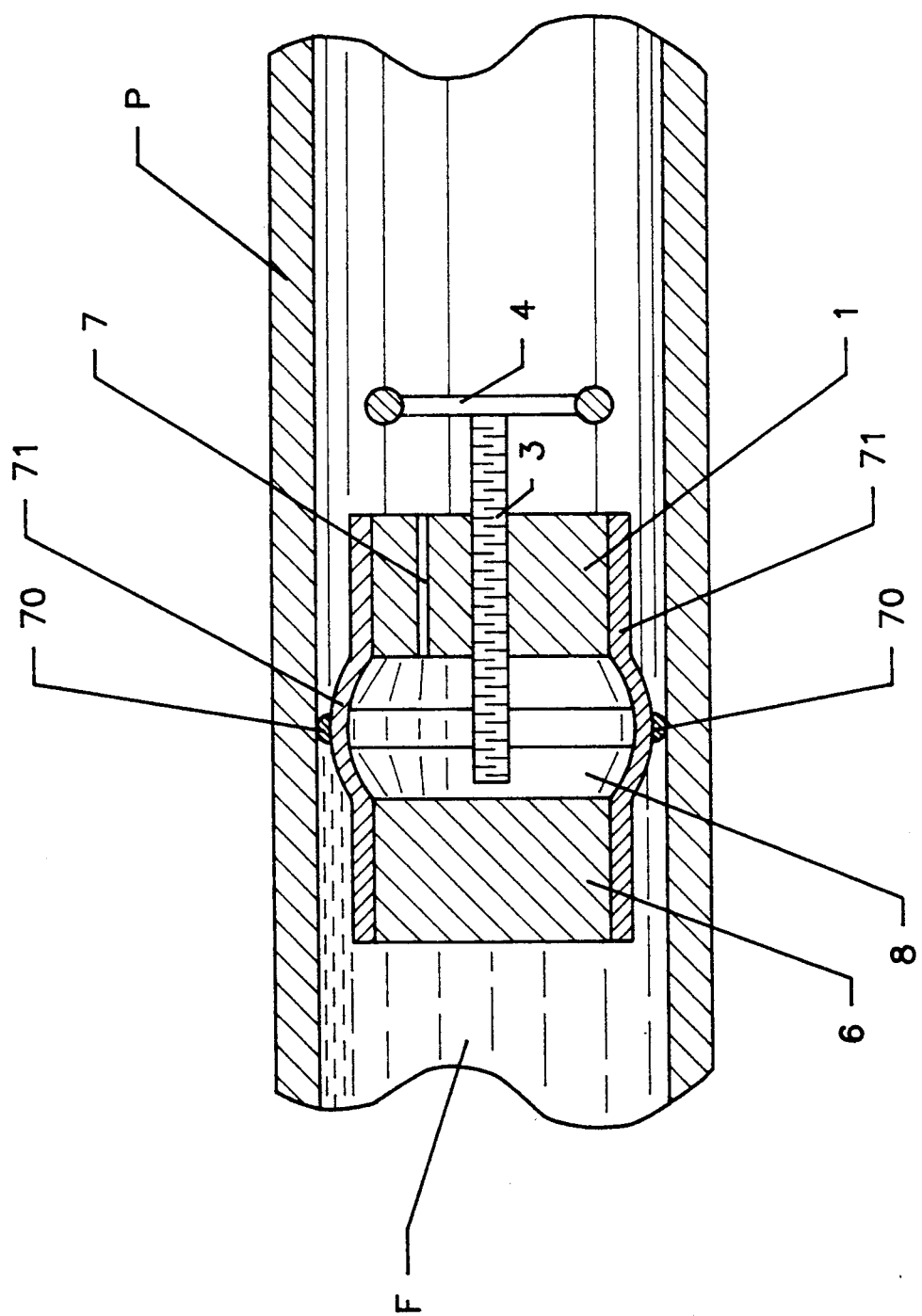
FIG. 15 is a medial cross-sectional view of an alternate embodiment of the present invention showing a metallic biasing member and interdependent seal.

A modification of the invention is shown in FIG. 15 wherein the two above-identified functions of the resilient elastomer (5) and seal (5a)—(i.e. biasing and sealing)—are instead accomplished by two distinct, albeit interdependent, structures, namely a metallic biasing member (71), and a seal member (70). The metallic biasing member (71) is of a stucture much like a metallic bellows, and is continuously attached to the perimeter of the primary (1) and follower (6) end plates in similar fashion to the resilient elastomer (5) of the preferred embodiment of the invention. In its "relaxed" position, the outside diameter of the metallic biasing member (71) is greater than the outside diameter of each of the end plates (1) and (6), respectively. When the end plates (1) and (6) are pulled apart (by any of the methods described for any of the embodiments of the present invention), the outside diameter of the metallic biasing member (71) decreases in a similar fashion to the resilient elastomer (5) of the preferred embodiment of the invention.

The seal member (71) is attached to the outside perimeter of the metallic biasing member (71) such that when the metallic biasing member radially expands the seal member engages with the inside wall of the pipe (P) in which the device is disposed in a similar fashion to the seal (5a) of the preferred embodiment of the invention. The seal member (70) may constructed of any common valve sealing material, including plastic, nylon, rubber, and soft metals.

While the above description contains many specificities, these should not be construed as limitations on the scope of the invention, but rather as an exemplification of one preferred embodiment and a limited number of modifications thereof. Many other variations are possible, for example:

The resilient elastomer (5) can be attached to the perimeters of the end plates (1) and (6) by adhesives, or screws, clamps, or bolts or other common fastening means;

Guide rods and sleeves may be attached to the end plates (1) and (6) to aid in alignment of the device;

The seal (5a) may be constructed of thicker material and of material of different density than that of the rest of the resilient elastomer;

The follower end plate (6) or the displacer rod (3) may be provided with a seat member so that the force of the displacer rod is distributed over a designated area of the follower end plate (6) when the two parts are in contact with each other;

A double-acting pneumatic or hydraulic cylinder may be used in place of the single-acting cylinder (10) shown in FIG. 3, and the displacer rod (3a) may be secured to the follower end plate (6);

The displacer rod (3) can be of non-circular cross-section, and more than one displacer rod can be used;

The area of the ends of the end plates may be less than 90% of the area of the cross-section of the pipe (P), and in particular may each be as low as 50% of the area of the cross-section of the pipe (P);

The widths (A) and (B) of the end plates can be of different dimensions;

The end plates (1) and (6) can be of construction other than flat plates, and in particular may be constructed of cylinders having one closed end;

The cylinder (10) may be mounted to the primary end plate (1) with any common fasteners;

The primary end plate (1) may be provided with a plurality of openings (i.e. vent holes (7) which allow air to pass between the inside and the outside of the assembly; and the primary end plate may be configured as a rim, a hub, and spokes wherein the spaces between the "spokes" are equivalent to vent holes (7);

The fluid material whose flow the present invention controls may be either a liquid, a gas, or a particulate which is reasonably capable of being conveyed through a conduit;

The biasing member (71) may be constructed of any resilient, impermeable, elastic material, including metals and non-metals; and The tank (16) may contain pressurized gas other than air.

Accordingly, the scope of the invention should be determined not by the embodiment illustrated, but by the appended claims and their legal equivalents.

I claim:

1. A valving assembly adapted to be operatively inserted within a substantially straight and compatibly sized section of a fluid material flow line having a substantially circular cross-section for temporarily stopping the flow of fluid material therethrough, said valving assembly comprising:

a first rigid end member;
  said first rigid end member having a substantially circular cross-sectional area and a substantially circular perimeter perpendicular to the axis of said fluid material flow line, the outside diameter of said first rigid end member being no greater than the inside diameter of said fluid material flow line;

a second rigid end member;
  said second rigid end member having a substantially circular cross-sectional area and a substantially circular perimeter perpendicular to the axis of said fluid material flow line, the outside diameter of said second rigid end member being no greater than the inside diameter of said fluid material flow line;
  wherein said first rigid end member is adapted to be inserted inside of said material flow line;
  and said second rigid end member is adapted to be inserted inside of said material flow line,
  and the cross-sectional area of each of said first rigid end member and said second rigid end member perpendicular to the axis of said valve assembly is at least ninety per cent of the cross-sectional flow area of said fluid material flow line;

a continuous resilient elastomeric member disposed between the perimeter of said first rigid end member and the perimeter of said second rigid end member;
  said continuous resilient elastomeric member having an inside surface and an outside surface, wherein said outside surface of said resilient elastomeric member faces an inside wall of said material flow line;
  said continuous resilient elastomeric member being attached to said first rigid end member and said second rigid end member, whereby said first rigid end member, said second rigid end member, and the inside surface of said continuous resilient elastomeric member effect a substantially closed cavity, and whereby said cross-sectional area of second end plate is at least ninety per cent of the cross-sectional area of said cavity when said device is inserted inside of said fluid material flow line;
  said resilient elastomeric member being axially extendable;
  said resilient elastomeric member being insertable inside of said flow line when said elastomeric member is axially extended;
  said resilient elastomeric member having an outside dimension, as measured transversely across and through the center of said elastomeric member, which is greater than the inside dimension of said material flow line, as measured transversely across and through the center of said material flow line, when said resilient elastomeric member is relaxed;

displacement means for temporarily axially displacing said first rigid end member from said second rigid end member,
  wherein said displacement means comprises an axially moveable displacer arm member, said axially moveable displacer arm member depending from said first rigid end member;

and a first vent opening in said first rigid end member, said first vent opening in said first rigid end member extending from said cavity to the outside of said first rigid end member, whereby said cavity is vented; and, wherein said continuous elastomeric member biases said first rigid end member toward said second rigid end member such that said continuous elastomeric member will, when said first rigid end member is axially displaced from said second rigid end member by said displacement means, radially contract at its perimeter so as to provide a passage between its perimeter and said fluid material flow line inside wall surface to permit fluid material flow therethrough, and will, when said second rigid end member is released by said displacement means, axially contract and radially expand at its perimeter such that its perimeter will engage an inside wall of said fluid material flow line so as to close said fluid material line from flow therethrough;

and wherein said perimeter of said resilient elastomeric member comprises an endless first convex seal member disposed around the perimeter of said elastomeric member;

and further comprising a material flow line interior wall engaging member attached to said first rigid end member by which said valving assembly resists axial motion within said fluid material flow line, said material flow line interior wall engaging member comprising a rigid frame member, and a threaded fastener engaged with said rigid frame member;

and wherein said threaded fastener is radially directed and disposed such that said fastener may be tightened against the inside wall surface of said fluid material flow line.

* * * * *